A. & C. N. CLOW.
Corn Sheller.
No. 13,122.
Patented June 26, 1855.
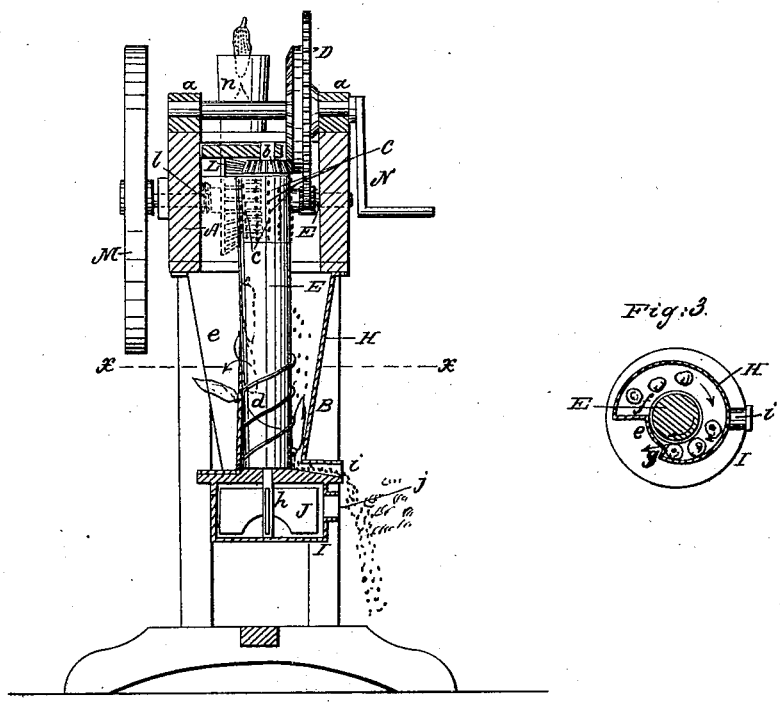
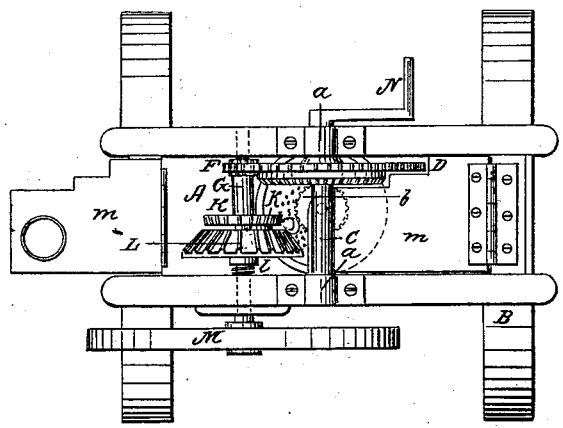

UNITED STATES PATENT OFFICE.

A. CLOW AND C. N. CLOW, OF PORT BYRON, NEW YORK.

CORN-SHELLER.

Specification of Letters Patent No. 13,122, dated June 26, 1855.

*To all whom it may concern:*

Be it known that we, ABRAM CLOW and CHARLES N. CLOW, of Port Byron, in the county of Cayuga and State of New York, have invented a new and Improved Corn-Sheller; and we do hereby declare that the following is a full, clear, and exact description of the same, reference being had to the annexed drawings, making a part of this specification, in which—

Figure 1, is a transverse vertical section of our improvement, the plane of section being through the center. Fig. 2, is a plan or top view of ditto, with one of the lids or covers thrown back. Fig. 3, is a horizontal section of ditto, $(x)$, $(x)$, Fig. 1, showing the plane of section.

Similar letters of reference indicate corresponding parts in the several figures.

The nature of our invention consists in the peculiar construction of the implement as will be presently shown and described whereby the corn is shelled from the cobs, perfectly winnowed, or separated from chaff and other light impurities and discharged separately from the cobs. The machine being also capable of adjustment so as to accommodate ears of corn of different dimensions.

To enable those skilled in the art to make and use our invention, we will proceed to describe its construction and operation.

A, represents a rectangular box supported by a proper framing B. On the upper part of this box A, there is placed a transverse shaft C, which runs in suitable bearings $(a)$, $(a)$. On the shaft C, there is hung a wheel D, which is cogged on its periphery and also cogged on its inner side. The side cogs gear into a pinion $(b)$ on the upper end of a vertical shaft E, and the other cogs gear into a pinion F, hung on a shaft G, which is placed transversely within the box A.

The upper end of the shaft E, has a series of teeth $(c)$ upon it as shown in Fig. 1, and the lower end of the said shaft has a screw thread $(d)$ upon it. The shaft E, below the box A, is encompassed by a spiral conical tube H, having an opening $(e)$ at one side as shown in Figs. 1, and 3. The tube H, may be considered as a spiral or scroll, or a correct idea may be conveyed by saying that the shaft E, is placed within it a little out of center so that the space indicated by the point $(f)$ between the shaft and the inner side of the tube is rather wider than that at the point indicated by $(g)$, see Fig. 3.

To the lower end of the tube H, there is attached a fan box I, having a fan J, within it, said fan being attached or hung on an arm $(h)$, connected to the shaft E, see Fig. 1. The upper part of the fan box forms the bottom of the tube H, and is slightly inclined toward a discharge aperture $(i)$. The fan box I, is also provided with an aperture $(j)$ directly underneath the aperture $(i)$.

On the shaft G, there is hung a wheel K, which is permanently attached to the shaft. The periphery of this wheel is slightly inclined or beveled, see Figs. 1, and 3. To one side of this wheel there is attached pins $(k)$, $(k)$, which fit in holes in the sides of a wheel L, placed loosely on the shaft G, so as to slide thereon. Around the shaft G, there is placed a spiral spring $(l)$ which keeps the wheel L, pressed against the wheel K, when said wheel L, is not acted upon by the ears of corn. The peripheries of both the wheels K, L, are provided with teeth as shown in Fig. 2, and the periphery of the wheel L, is beveled, but in a reverse direction to the periphery of the wheel K. On one end of the shaft G, there is placed a fly wheel M, and on one end of the shaft C, there is a crank N.

The box A, is provided with lids or covers $(m)$ one of which is provided with a tube $(n)$ which is directly over the space between the wheels K, L, and shaft E.

The operation will be readily seen. Power being applied to the crank N, the ears of corn represented in red are dropped, one at a time, down the tube $(n)$. The upper toothed portion of the shaft E, rotates the ears and the toothed peripheries of the wheels K, K, shell the corn from the ears the wheel L, in consequence of the spring $(l)$ yielding or giving to compensate for ears of varying thicknesses. The shelled corn falls to the bottom of the tube H, and passes out of the aperture $(i)$ into a proper receptacle prepared to receive it, and a blast of air generated by the fan J, passes through the shelled corn as it passes into the receptacle. The cobs, also shown in red, fall, after having the corn shelled from them, to the bottom of the tube H, at the point $f$, and are carried around by the revolutions of the shaft E, to the point (*g*), and as the space is narrower at that point than at the point *f*, the screw (*d*) will enter the cobs and force them upward to the opening (*e*) through which they fall upon the floor or ground.

The above machine is extremely simple, not liable to get out of repair and will operate well.

We are aware that implements for shelling and winnowing corn have been previously used but differing in construction and arrangement, from ours. We do not claim separately either of the parts herein described for shelling the corn from the cobs, for shelling wheels similarly constructed have been previously invented, but What we do claim as new and desire to secure by Letters Patent, is—

We claim the tube H, in combination with the screw (*d*) on the shaft E, arranged as herein shown for discharging the cobs separately from the shelled corn.

ABRAM CLOW.
CHAS. N. CLOW.

Witnesses:
HORACE PERKINS,
JOHN G. MYER,
WALTER E. WETHEY.